(12) United States Patent
Tucker (10) Patent No.: US 7,780,050 B2
(45) Date of Patent: Aug. 24, 2010

(54) EASY LOADING CARGO RACK ASSEMBLY FOR VEHICLE

(76) Inventor: Timothy Tucker, 228 N. Goodman St., Apt. 8, Rochester, NY (US) 14607

( * ) Notice: Subject to any disclaimer, the term of this patent is extended or adjusted under 35 U.S.C. 154(b) by 1189 days.

(21) Appl. No.: 11/366,278

(22) Filed: Mar. 2, 2006

(65) Prior Publication Data
US 2006/0196904 A1 Sep. 7, 2006

Related U.S. Application Data

(60) Provisional application No. 60/658,055, filed on Mar. 2, 2005.

(51) Int. Cl.
*B60R 9/04* (2006.01)
*B60R 9/00* (2006.01)
*B60R 9/048* (2006.01)
*B60P 9/00* (2006.01)

(52) U.S. Cl. .................. 224/310; 224/309; 224/315; 224/324; 414/462

(58) Field of Classification Search .......... 224/310, 224/309, 315, 324; 414/680, 462, 546, 547; 248/503; 182/127
See application file for complete search history.

(56) References Cited

U.S. PATENT DOCUMENTS

| 3,495,729 | A | * | 2/1970 | Kruse | 414/462 |
|---|---|---|---|---|---|
| 5,297,912 | A | * | 3/1994 | Levi | 414/462 |
| 5,350,097 | A | | 9/1994 | Walter | |
| 5,360,150 | A | * | 11/1994 | Praz | 224/310 |
| 5,398,778 | A | * | 3/1995 | Sexton | 182/127 |
| 5,421,495 | A | * | 6/1995 | Bubik et al. | 224/310 |
| 5,827,036 | A | * | 10/1998 | Steffes et al. | 414/462 |
| 6,099,231 | A | * | 8/2000 | Levi | 414/462 |
| 6,209,768 | B1 | | 4/2001 | Boaz | |
| 6,427,889 | B1 | * | 8/2002 | Levi | 224/315 |
| 6,428,263 | B1 | * | 8/2002 | Schellens | 414/462 |
| 6,561,396 | B2 | * | 5/2003 | Ketterhagen | 224/310 |
| 6,764,268 | B2 | * | 7/2004 | Levi | 414/462 |

OTHER PUBLICATIONS 1 page of a website printout showing an #897XT Hullavator from www.thuleracks.com/thule/featured_product_hullavator.asp printed from the World Wide Web on Feb. 22, 2006.
1 page of a website printout showing a hullavator from www.boundarywaterscatalog.com/browse.cfm/4.5192.htm printed from the World Wide Web on Feb. 22, 2006.

* cited by examiner

*Primary Examiner*—Nathan J Newhouse
*Assistant Examiner*—Lester L Vanterpool
(74) *Attorney, Agent, or Firm*—Hiscock & Barclay, LLP (57) ABSTRACT

The cargo rack assembly a support rack such as the roof rack of a vehicle to assist in the loading and unloading of cargo onto the support rack. The assembly includes load bars connected to base bars via a pivoting lever; the load bars include straps and load arms for securing cargo to the assembly. The base bars are affixed to the support rack and the load bars and pivoting levers transition between a secured position and a loading/unloading position in a smooth motion. The assembly may include a tensioning system for biasing the load bars to the secure position to aid the user in lifting the cargo.

20 Claims, 9 Drawing Sheets

EASY LOADING CARGO RACK ASSEMBLY FOR VEHICLE

CROSS-REFERENCE TO RELATED APPLICATIONS

This application claims the benefit of the priority date of U.S. provisional patent application Ser. No. 60/658,055 filed Mar. 2, 2005.

FIELD OF THE INVENTION

The present invention relates generally to roof-top cargo carriers for vehicles. More particularly, the present invention relates to such a cargo carrier having an apparatus for facilitating the loading and unloading of cargo, and to methods of loading and unloading cargo onto such a carrier.

BACKGROUND OF THE INVENTION

Many people use roof-top carriers to carry cargo, such as, for example, kayaks, canoes, bicycles, and other sports equipment, on the roofs of their vehicles. Such carriers enable cargo to be carried while preserving interior space for passengers and other items.

There are many different types of roof-top carriers on the market. However, due to their roof-top position, it can be difficult to load and/or unload such carriers. Typically, a user must physically lift and place the cargo items upon the roof-top carrier or rack, which is likely to be located above their heads. Lifting even moderately heavy items on to a roof-top carrier can be difficult, especially with the widespread use of sports utility vehicles which have roofs that are typically much higher and harder to reach than other types of vehicles.

Therefore, what is needed is an apparatus and method that reduces the physical strength and effort required to load cargo onto a roof-top cargo rack or carrier.

SUMMARY OF THE INVENTION

The assembly sits on top an existing roof-top carrier with base bars affixing the assembly to the carrier. The base bars include a base member and a pivoting lever. One end of the pivoting lever attaches to the base bar. The pivoting levers are interconnected with a crossbar so the levers move simultaneously when the assembly is in motion. Load bars are coupled to the heads of the pivoting levers and are configured for sliding movement relative to the base bars. When the pivoting levers move in a clockwise direction (as viewed in the figures) the load bars move in a clockwise and downward direction to bring the assembly to the load position. When the pivoting levers move in a counter-clockwise direction (as viewed in the figures) the load bars move in a counter-clockwise and upward direction to bring the assembly into the secured position on the roof-top carrier. One or more load arms extend from each load bar. The load arms are configured for holding cargo.

In one embodiment, a tensioning system is included with each of the load bars. The tensioning system includes an extension spring and a damping piston connected to a locking strap at each end. The locking straps are operable to increase the tension in the spring when the assembly is loaded. The tensioning system biases the load bars to the secure position of the assembly.

In another embodiment each load arm includes an arm member within which is disposed a cable guide, spring and cam. A lever is disposed external to the arm member and is coupled to the cam. Cables run though the inside of the load arm and load bar, from the pulley in the head of the pivoting lever to one end of the spring and from the other end of the spring to the cam. A protective strap affixes to the load bar and runs over the cargo on the load arm down to the cam. When the lever is moved in one direction it forces the cam to secure the protective strap and produce tension on the spring and cable. When the lever is moved in the opposite direction, the cam rotates releasing the strap and tension on the spring.

The spring pulls the cable in a downward direction when there is tension. Tension on the springs and cables creates an upward force that allows the user to push the apparatus on top of the car without supplying much physical force. The pivoting levers rotate in a specified direction to slide the load bars and move the apparatus onto the roof-top carrier where it is secured.

An advantage of the invention is that the transition motion of the assembly between the secure position and the loading/unloading position is a smooth natural motion that is easy for the user. The motion requires minimal vertical motion of the user's arms compared to conventional cargo racks. Further, the invention provides mechanical assistance to the lifting motion without expensive hydraulics or motors.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
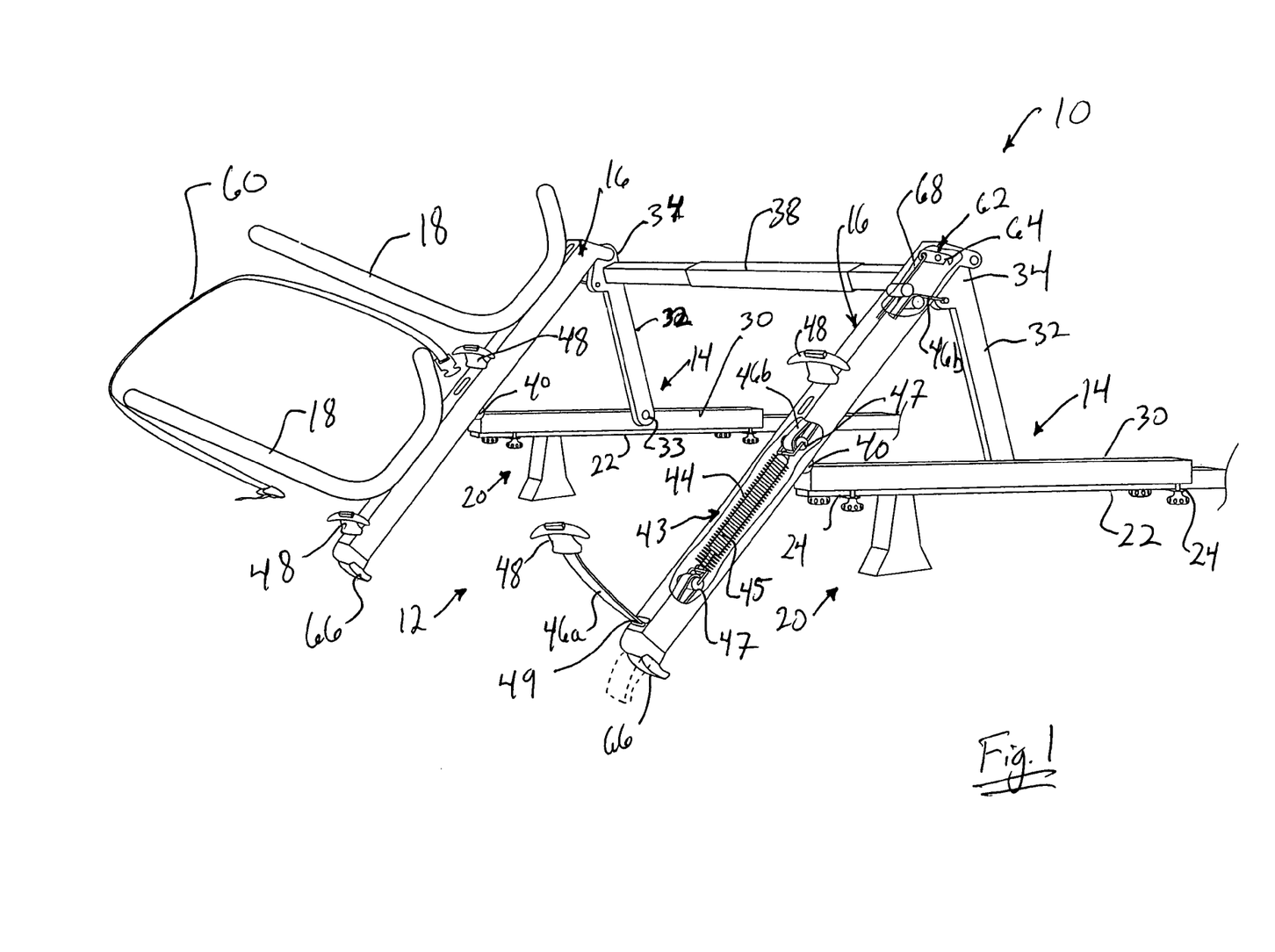
FIG. 1 is an isometric view of one embodiment of a vehicle cargo loader and carrier of the present invention.

Referring to FIG. 1, there is shown the cargo loader and carrying assembly of the present invention. The cargo loader and carrying assembly (hereinafter assembly) 10 includes a frame, generally designated 12, that includes a pair of base bars 14, a pair of load bars 16, and a plurality of load arms 18, and which is constructed from a strong rigid material, such as, for example, aluminum, steel, or even a rigid and heavy-duty plastic. Note that the load arms are omitted on one of the base bars 14 for clarity. In a particular embodiment, the base bars 14 and the load bars 16 comprise stock tubing having a rectangular cross-section, though other shapes and non-tubing may also be used. As shown in the figures, the base bars 14 are configured for attaching to an existing support rack 20, such as a roof rack for a vehicle. The support rack includes an opposing member 22. The roof-top rack 20 may alternatively be integral with and/or constitute a part of assembly 10. In such a configuration, the roof rack 20 is secured to a vehicle in the same manner as other after market roof racks.

The base bars 14 each include base members 30 and pivoting levers 32. Each base member 30 is affixed to a respective and opposite end member 22 of rack 20. Particularly, each base member 30 slides over an opposing member 22 and brackets 24 are secured to the underside of the base bars 14 with thumb screws or other fasteners. The pivoting levers 32 are pivotally attached or coupled at one end thereof to a respective base member 30 via a fulcrum 33. Each pivoting lever 32 includes a cam end 34, which are interconnected by an extendable crossbar 38, and thus movement of one cam end 34 tracks the movement of the other cam end 34. The crossbar 38 is telescopic so the user can adjust the apparatus to fit a large variety of vehicles. Base members 30 further include respective rollers 40.

The load bars 16 are coupled to respective cam ends 34 and configured for sliding movement relative to base members 30. Pivotal motion of the pivoting lever 32 in either a clockwise or counter-clockwise direction produces sliding movement of load bars 16 relative to the corresponding rollers 40 and base members 30. Thus, as pivoting lever 32 is pivoted in a clockwise direction the load bars 16 also pivot in a generally clockwise and downward direction about the rollers 40 from a generally horizontal orientation toward a more vertical orientation (see FIGS. 2B-2E).

A tensioning system 43 is internal to each of the load bars 16 and includes an extension spring 44, a dampening piston 45, and locking straps 46a and 46b. The extension spring 44 and the damping piston 45 are arranged in parallel and the piston 45 is a pneumatic piston configured to slow the contraction of the spring 44. The spring 44 and piston 45 include pulleys 47 at either end for engaging the straps 46a,b. Each of the locking straps 46a,b terminates in a clasp 48 external to the load bars 16. The locking strap 46a is affixed at one end to the end of the load bar 16, loops through a pulley 47, passes under a roller (FIG. 2A) proximate to the end of the load bar 16, and protrudes through a locking port 49. The locking strap 46b is affixed to the cam end 34 of the lever 32, passes over a roller, loops through the pulley 47, passes under another roller (FIG. 2A), and protrudes through the locking port 49. When the clasps 48 are resting against the surface of the load bars 16, the locking straps 46a,b are in a low tension position (FIG. 2E). The straps 46a,b may be independently pulled through the locking ports 49 to a high tension position where the straps 46a,b may be locked into position (FIG. 2A-2D). When the assembly is loaded to half capacity, only one strap 46a,b is placed in the high tension position. When the assembly is loaded to more than half capacity, both straps 46a,b are placed into the high tension position to increase the lifting force applied by the spring 44.

One or more load arms 18 extend from each of the load bars 16. In a particular embodiment, the load arms 18 are interchangeable to accommodate different equipment. For example, the load arms 18 shown in the figures are particularly suitable for securing a kayak or a canoe to the assembly 10. Alternative load arms are configured to secure other equipment, such as a row boat, bicycles, a cargo bin, etc. Anything that can be affixed to a vehicle roof rack may be affixed to the load bars 16 or load arms 18. In an alternative embodiment, the load arms 18 are integral with the load bars 16. A plurality of cargo retaining and protective straps 60 have a first end with a buckle or a ratchet that connects to a clasp 48 and a second end that locks into a slot in the load bar 16. The buckle or ratchet is operable to tighten the strap 60, thus securing the equipment to the load arms 18. In the present embodiment, the locking straps 46a,b must be extended to the high tension position in order to connect the clasp 48 to the strap 60. Thus, if both straps 60 are required, the assembly 10 is fully loaded and both locking straps are required to be in the high tension position to result in the maximum lifting force in the extension spring 44. This configuration provides a safety feature in that the user must put the locking straps 46a,b in the low tension position before removing the cargo. Removing the weight of the cargo while the straps 46a,b are in the high tension position may lead to the assembly 10 moving toward the horizontal position prematurely due to the high tension in the spring 44. In an alternative embodiment, however, the locking straps 46a,b are independent from the straps 60, which may be secured directly to the load arm 18 or the load bar 16, and the locking straps 46a,b are locked into the high tension position at the user's discretion.

A latching mechanism 62 is associated with the load bars 16 and includes a latch 64, a release lever 66, and a cable 68 therebetween. The latch 64 engages a catch that is integral with or attached to the base member 30 when the assembly 10 is in the horizontal traveling position. The lever 66 is pushed down to lock the latch 64 in engagement with the catch. The lever 66 is pulled up to release the latch 64 from the catch and allow the assembly 10 to be moved into the loading/unloading position. The latch 64 may be biased to the latching position by a spring.

The assembly 10 is preferably in its lowest position (FIGS. 2E and 2D) when placing or loading cargo. The straps 60 are used to secure the equipment to the load arms 18 and the user physically pushes the cargo and/or load arms 18 and/or load bars 16 in a generally upward direction towards the roof of the vehicle to which assembly 10 is affixed. The tension placed upon the springs 44 pulls on the locking straps 46a,b and places a generally upward-directed force F on the load bars 16, which complements the force applied by a user and thereby reduces the amount of force a user must supply in order to move load bars 16 and rotate the pivoting lever 32. The damping piston 45 slows the upward motion to prevent the spring force from snapping the assembly 10 into the horizontal position, which would risk damage to the vehicle or assembly 10. The damping piston 45 is configured to have a minimal affect on the extension of the spring 44 so that the user may easily transition the assembly 10 from the secured position (FIG. 2A) to the loading/unloading position (FIG. 2D)

Figure 2A:
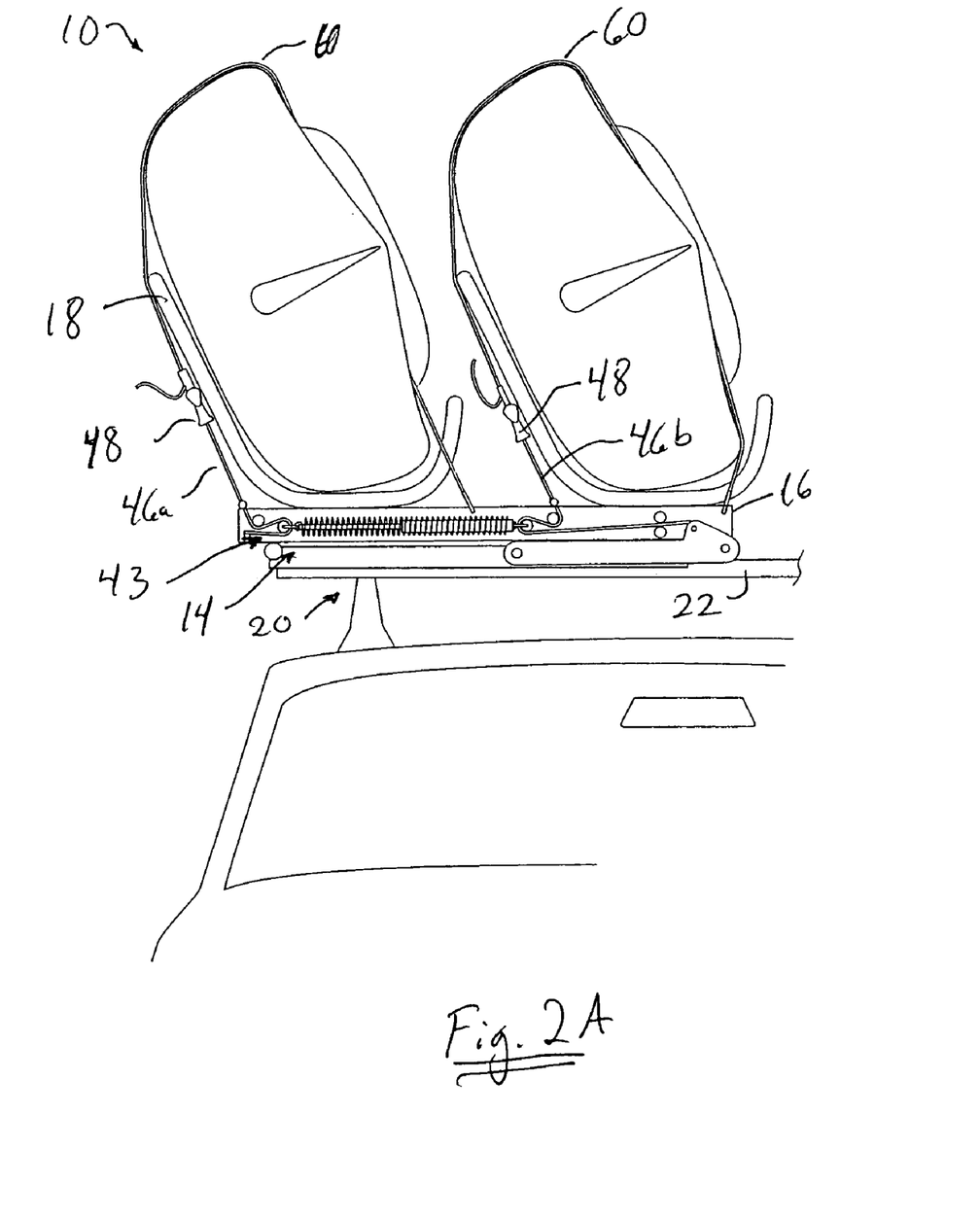
FIGS. 2A-2E are end views of the cargo loader and carrier of FIG. 1 in the loading position, the secured position, and intermediate positions.
Figure 2B:
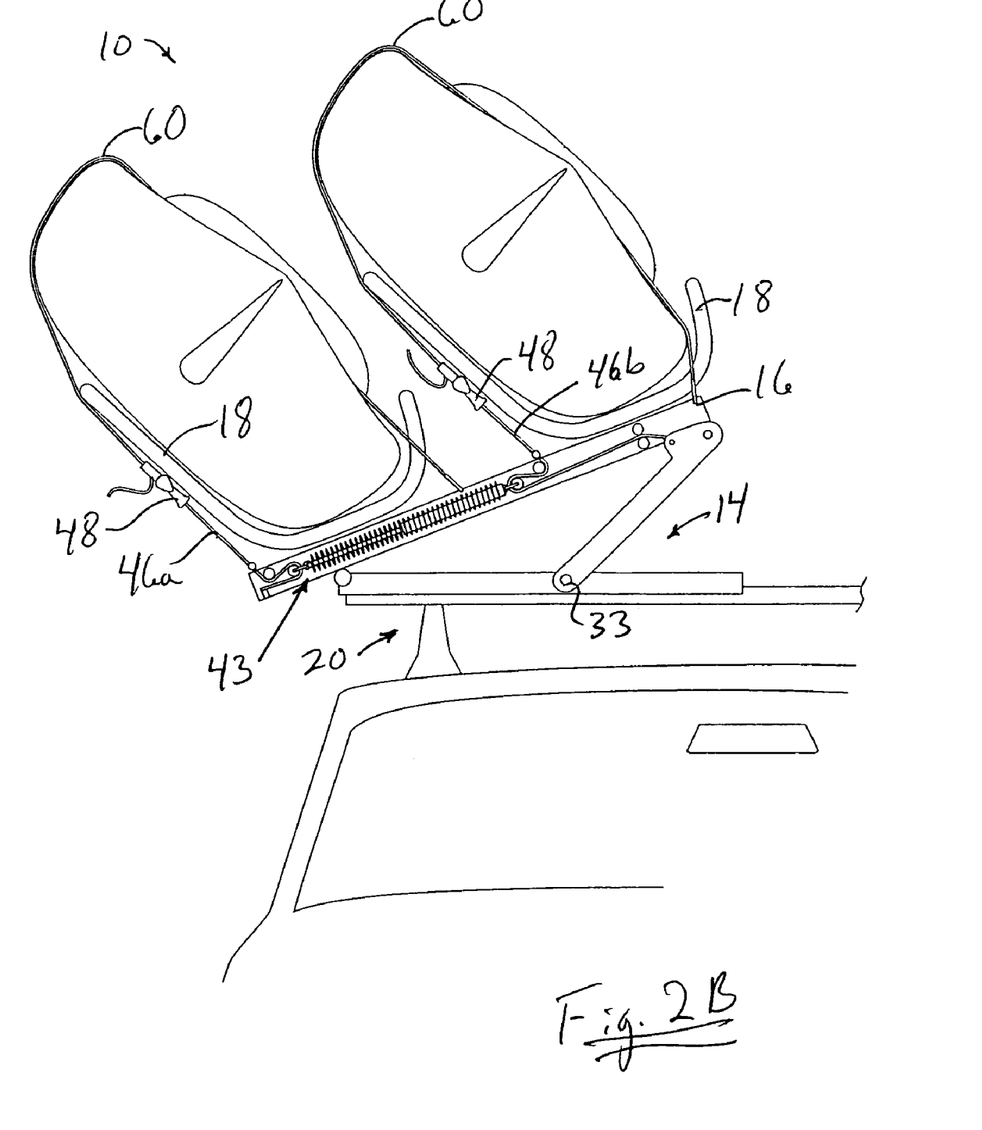
Figure 2C:
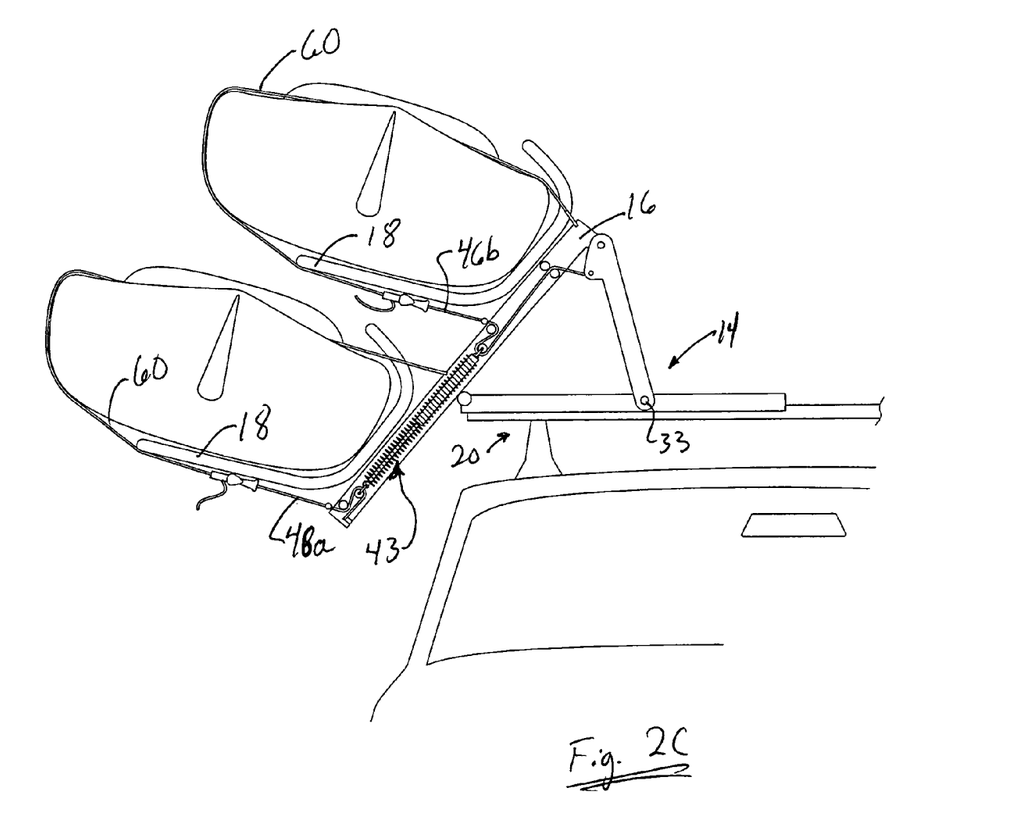
Figure 2D:
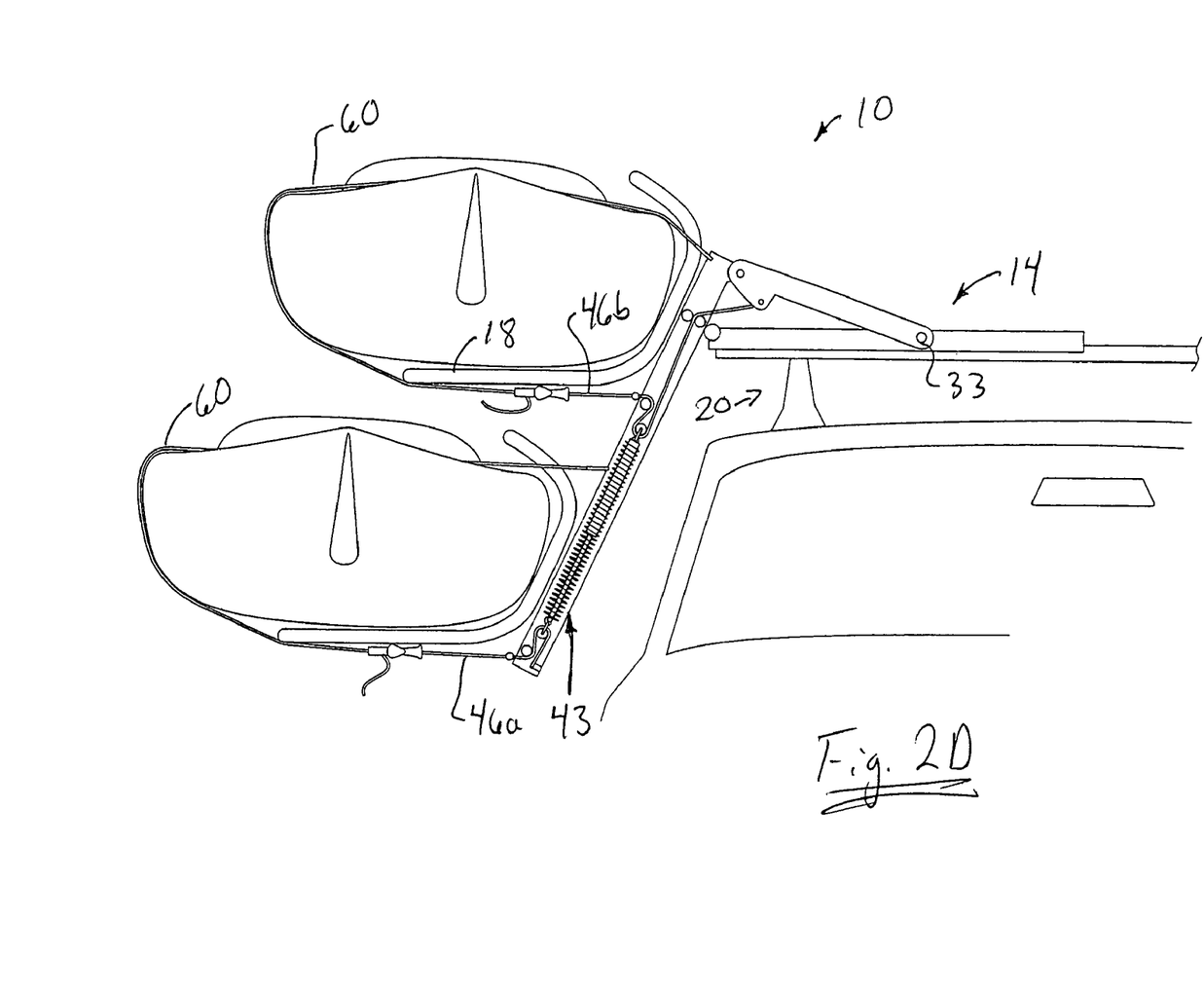
Figure 2E:
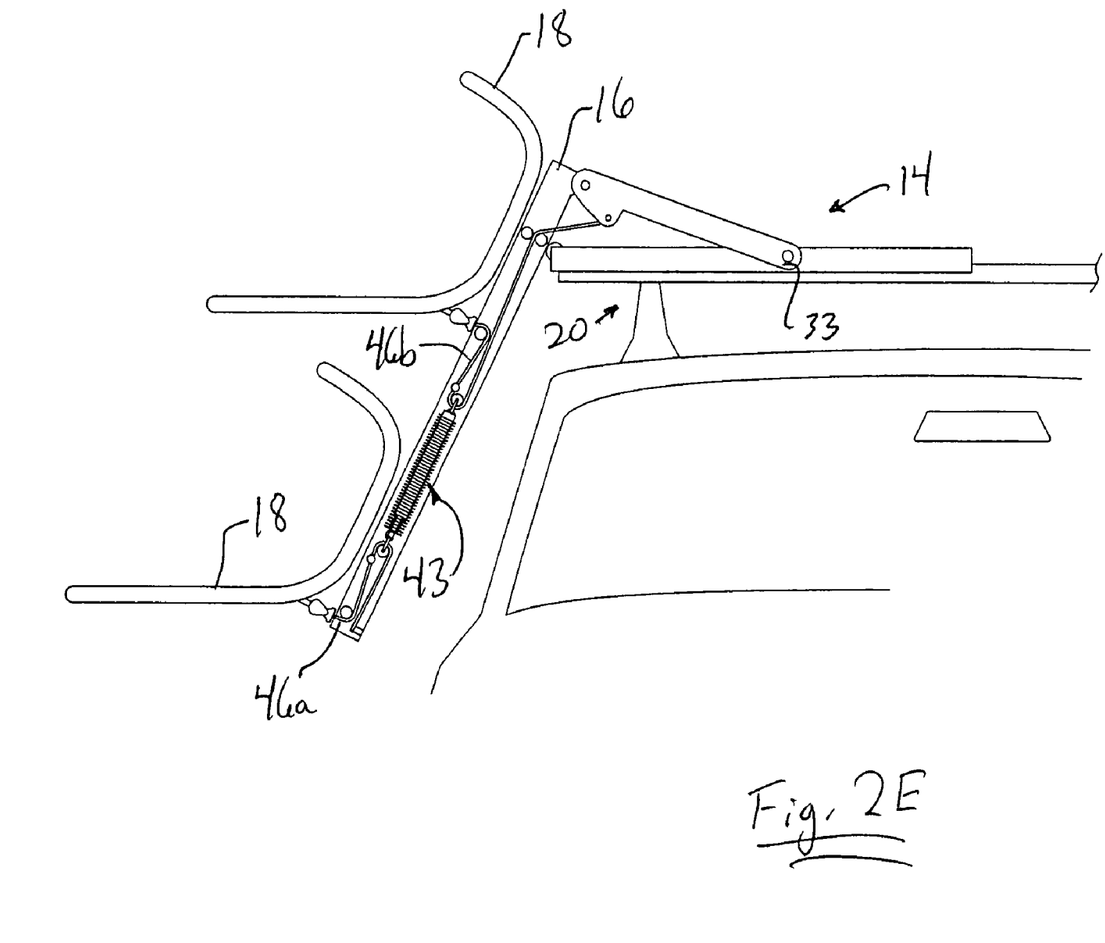

As the load bars 16 are slid upward from the position of FIG. 2D over rollers 40 and toward the stored position of FIG. 2A, pivoting lever 32 is pivoted about its fulcrum 33 and cam ends 34 thereof move in a generally semi-circular path. The load bars 16 are thus moved from a generally vertical orientation (FIG. 2D) to a generally horizontal orientation (FIG. 2A). The load bars 16 are secured in the position of FIG. 2A by the latching mechanism 62.

In order to release the cargo, a user must release latching mechanism 62 and slide the load bars 16 over the rollers 40 to the position shown in FIG. 2D. When in the lowered position, the user separates the clasps 48 from the buckles on the straps 60 and unlocks the locking straps 46a,b to release tension of the extension springs 44. As this tension releases, damping piston 45 slows the contraction of the spring 44 to thus release the tension slowly.

The resting position of the load bars 16 is such that the end connected to the cam end 34 is slightly raised above the base member 30 due to the configuration of the tensioning system 43 and the shape of the cam end 34. The user must push down on the load bar 16 to secure the latching mechanism 62. Thus the load bars 16 pop up when the user lifts the release levers 66 to release the latch 64 and aids in the transition to the loading position of the assembly 10.

Figure 3A:
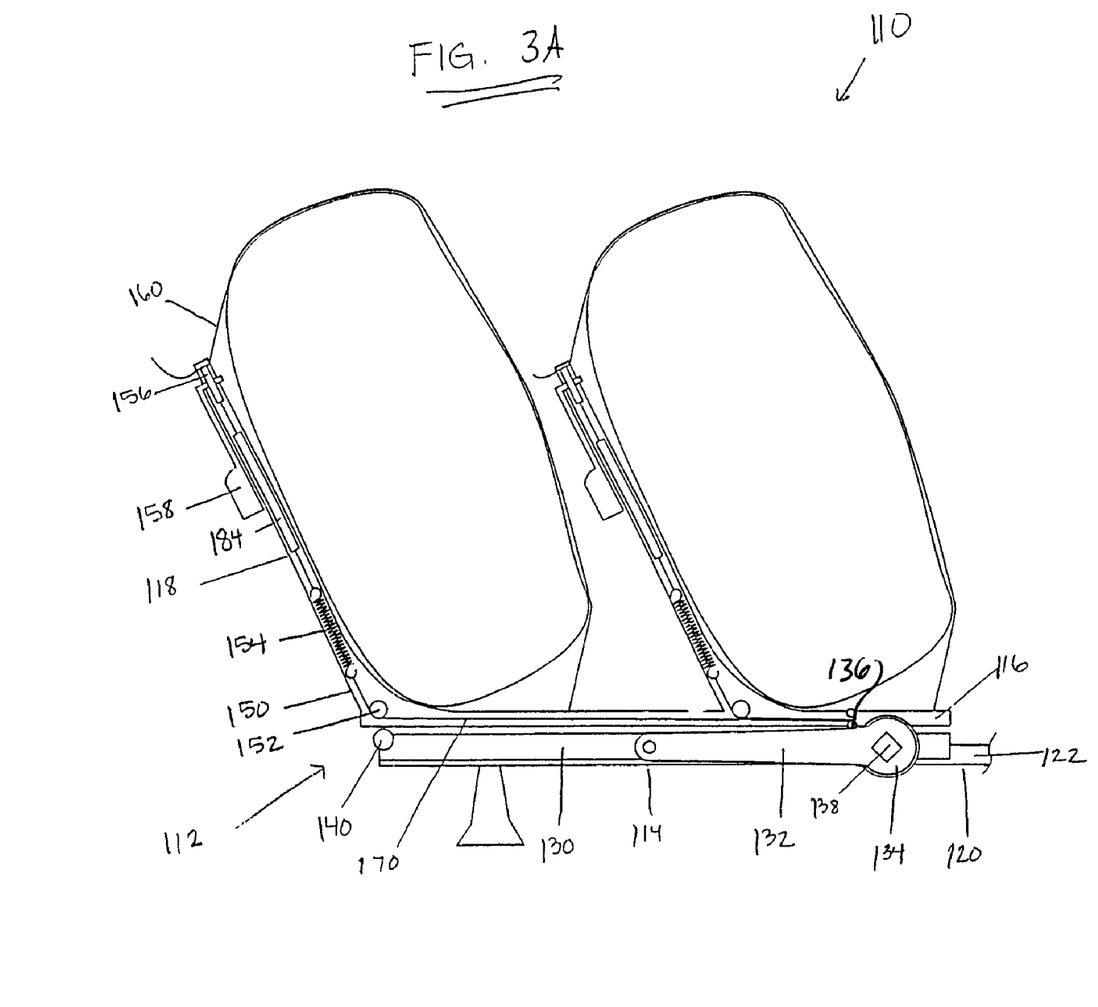
FIG. 3A is an end view of a second embodiment of a vehicle cargo loader and carrier of the present invention in the secured position for transporting.
Figure 3B:
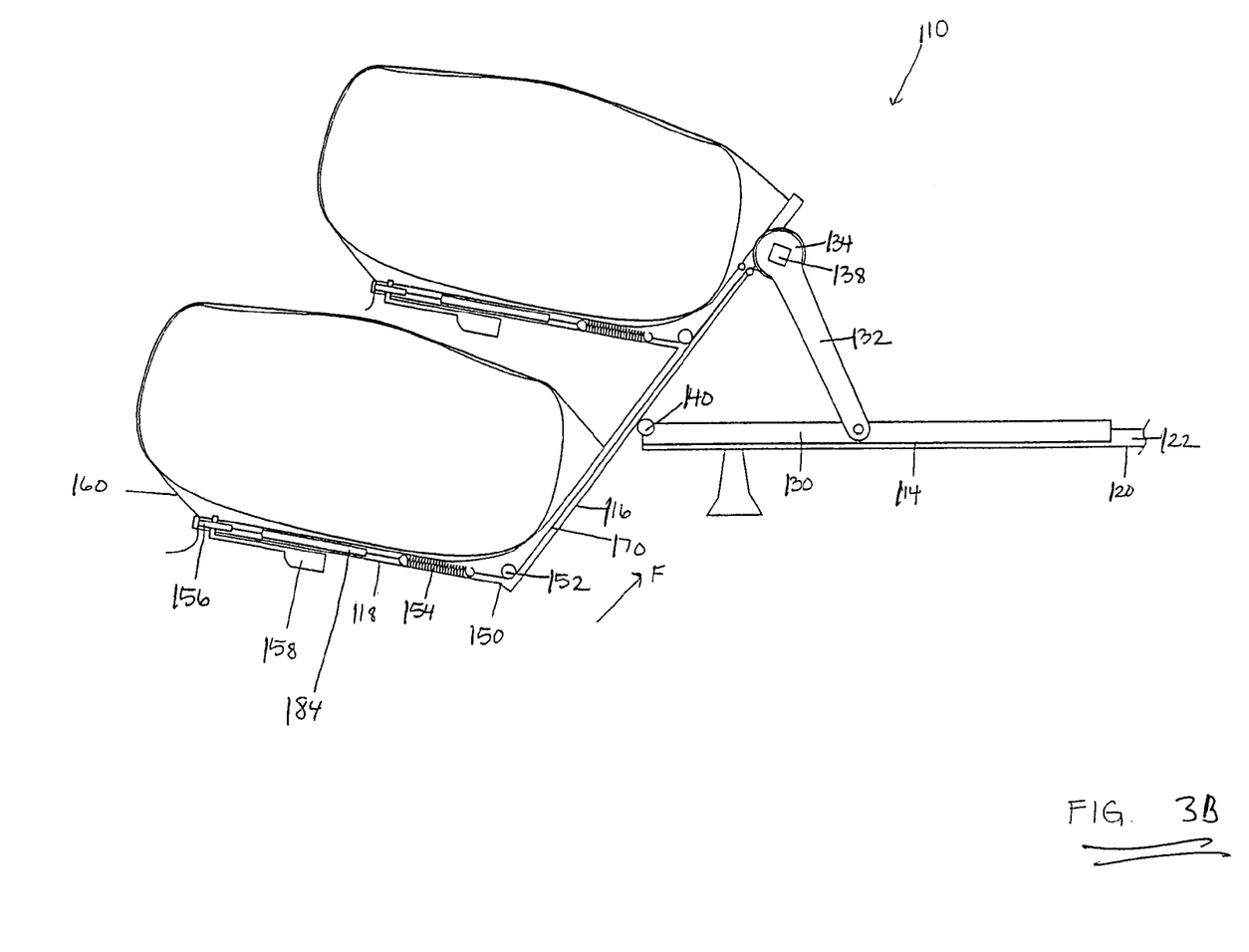
FIG. 3B is an end view of the vehicle cargo loader and carrier of FIG. 3A in an intermediate position as the cargo is being moved toward a loading position.
Figure 3C:
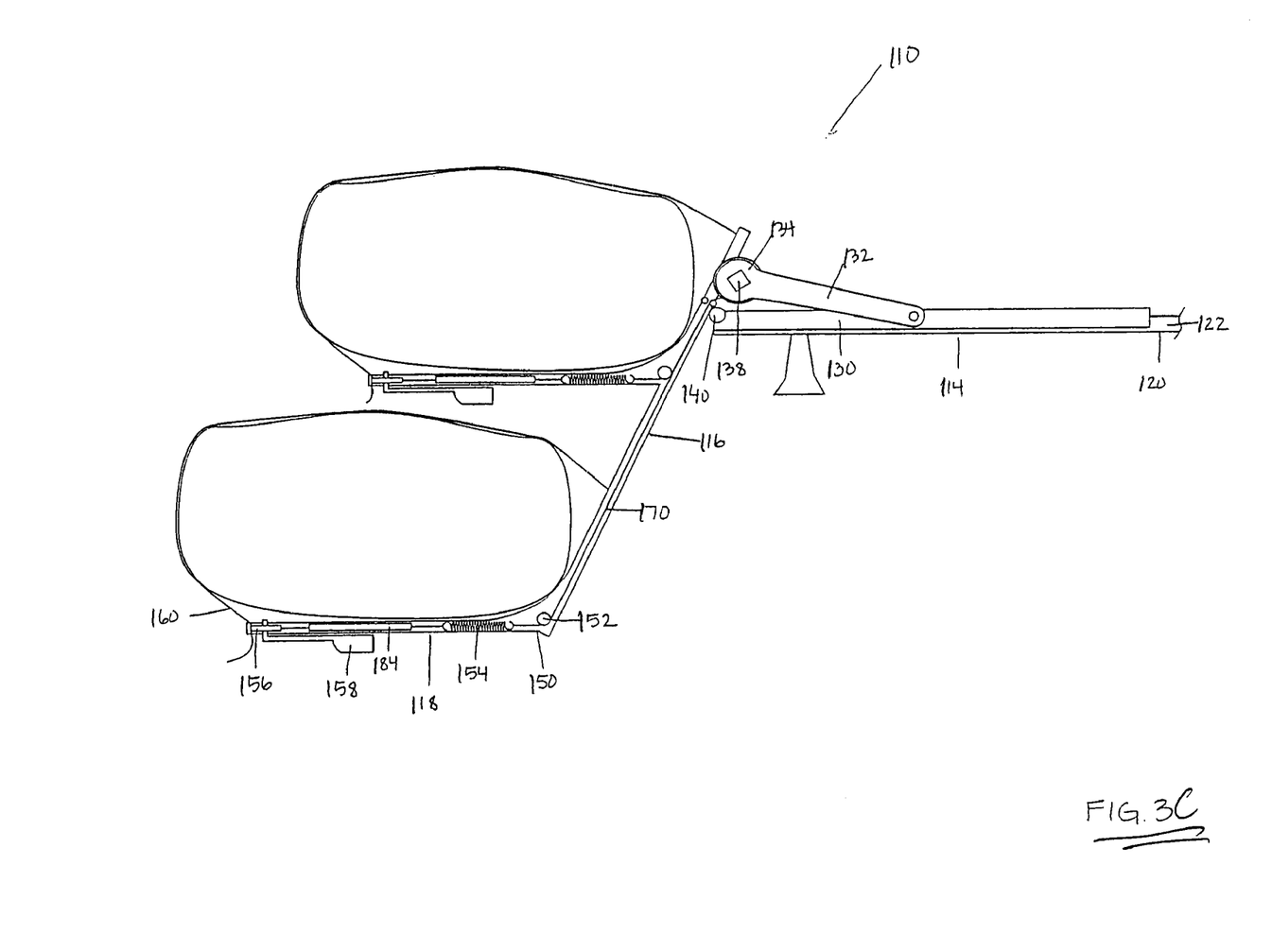
FIG. 3C is an end view of the vehicle cargo loader and carrier of FIG. 3A in a position in which a user loads and/or unloads cargo.

An alternative embodiment of the cargo loader and carrying assembly is shown particularly in FIGS. 3A-3C. Similarly to the previous embodiment, the assembly 110 is configured for being coupled or otherwise affixed to a roof-top cargo rack or carrier attached to the roof of a vehicle.

The assembly 110 includes a frame, generally designated 112, that includes the base bars 114, the load bars 116, and the load arms 118, and which is constructed from a strong rigid material, such as, for example, aluminum, steel, or even a rigid and heavy-duty plastic. In the present embodiment, the base bars 114 are configured for attaching to an existing roof-top rack 120 of a vehicle (not shown) having an opposing member 122, although it is to be understood that the roof-top rack 120 can be integral with and/or constitute a part of the assembly 110.

The base bars 114 each include base members 130 and pivoting levers 132. Each base member 130 is affixed to a respective and opposite end member 122 (only one shown in FIGS. 3A-3C) of the rack 120, and the pivoting levers 132 are pivotally attached or coupled at one end thereof to a respective base member 130. Each pivoting lever 132 has a head end 134 with a pulley 136. The head ends 134 of the levers 132 are interconnected by an adjustable crossbar 138, and thus movement of one head end 134 tracks the movement of the other head end 134. The crossbar 138 is telescopic so the user can adjust the apparatus to fit a large variety of vehicles. The base members 130 include respective rollers 140 proximate the ends thereof opposite the pivoting levers 132.

The load bars 116 are coupled and/or affixed to respective head ends 134. The load bars 116 are configured for sliding movement relative to the base members 130. Pivotal motion of the pivoting lever 132 in either a clockwise or counterclockwise direction produces sliding movement of the load bars 116 relative to the corresponding rollers 140 and base members 130. Thus, as the pivoting lever 132 is pivoted in a clockwise direction the load bars 116 also pivot in a generally clockwise and downward direction about the rollers 140 from a generally horizontal orientation toward a more vertical orientation (see FIGS. 3B and 3C).

One or more load arms 118 extend from each load bar 116. It is to be understood that the load arms 118 may be integral and/or monolithic with the load bars 116. Each load arm 118 includes an arm member 150 within which is disposed a cable guide 152, spring 154, and cam 156. A lever 158 is disposed external to the arm member 150 and is coupled to the cam 156. Cargo retaining and protective straps 160 have a first end connected to the cam 156, are routed around/over the cargo item, and at a second end thereof are coupled to the load bar 116. The cables 170 are strung through the interior of the load bar 116 and the load arms 118 from a predetermined point on the pulley 136 of the head end 134, around and/or through the cable guides 152, to one end of the spring 154 and from the other end of the spring 154 to the cam 156. The load bar 116 has dual cable guides 142 located near the head end 134 to direct the cable 170 from the pulley 136 down the load bar 116. The lever 158, when moved in a first direction, causes the cam 156 to rotate and thereby draw/tighten the straps 160, tensions cables 170, and springs 154. The lever 158, when moved in a second direction, causes the cam 156 to rotate and thereby release or loosen the straps 160, cables 170, and springs 154.

The assembly 110 is preferably in its lowest position (FIG. 3C) when placing or loading cargo. The levers 158 are associated with each load arm 118 to secure the cargo thereto via the straps 160. Once cargo is thus secured to the assembly 110, the user physically pushes the cargo and/or load arms 118 and/or load bars 116 in a generally upward direction towards the roof of the vehicle to which the assembly 110 is affixed. The tension placed upon the springs 154 pulls on the cable 170 affixed to the pulley 136 and places a generally upward-directed force F on the load bars 116, which complements the force applied by a user and thereby reduces the amount of force a user must supply in order to move the load bars 116 and rotate the pivoting lever 132.

As the load bars 116 are slid upward from the position of FIG. 3C over roller 140 and toward the stored position of FIG. 3A, the pivoting lever 132 is pivoted about its pivot point (not referenced) and the head ends 134 thereof move in a generally semi-circular path. The load bars 116 are thus moved from a generally vertical orientation (FIG. 3C) to a generally horizontal orientation (FIG. 3A). The load bars 116 and/or rotating lever 132 are secured in the position of FIG. 3A by a locking means that may be similar to the latching mechanism of the first embodiment.

In order to release the cargo, a user must release latching mechanism and slide the load bars 116 over the rollers 140 to the position shown in FIG. 3C. When in the lowered position, the user actuates the levers 158, causing the cams 156 to release tension on the springs 154 and the cables 170. As this tension releases, a damping piston 184, such as a shock absorbing mechanism, releases the tension slowly.

It should be particularly noted that in sufficiently large vehicles, a second, mirror-image assembly as described in the above embodiments may be added to the other side of the support rack 20 or 120. It should also be noted that motion of the assembly from the loading position to the secured position and vice versa provides an advantage over conventional cargo rack loading systems even without the tensioning mechanisms described in the detailed embodiments. This is because the pivoting motion is smooth with a gradual change in direction, rather than abrupt changes that requires multiple steps in going between positions. Therefore the cargo loader and carrying assembly without the tensioning systems is considered to be within the scope of the invention. It should be further noted that while the spring 44 and damping piston 45 of the first embodiment are shown in a parallel configuration alternate embodiments are imagined in which the spring and piston are in a series configuration. Similarly, the spring 154 and piston 184 of the second embodiment are shown in a series configuration; however a parallel configuration may alternatively be used.

One skilled in the art will recognize that the cargo rack assembly of either embodiment may be configured for coupling to a support rack that isn't a vehicle roof rack. For example, the support rack may be affixed to a wall or a ceiling, such as those in a garage. Such configurations may require alternate arrangement of the joints. Alternatively, the support rack may be affixed to the top of a structure, such as the roof of a shed. In a further alternative, the support rack is mounted to a dock on the water, such that the load arms may extend toward or into the water. Thus, a watercraft may be secured to the load arms and the assembly assists in lifting the craft out of the water into a secure storage location on the dock.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A cargo rack assembly for affixing to a support rack, said cargo rack assembly comprising:
   a plurality of load bars having a pivot end, a handle end, and means for securing a load;
   a plurality of base bars each having a first end and a second end;
   a secured fulcrum located between the first and second ends of each base bar;
   a pivoting lever associated with each load bar, the pivoting lever having a cam end pivotally connected to the pivot end of the load bar and a fulcrum end pivotally connected to the base bar at the secured fulcrum;
   means for applying a tensile force between each of the handle ends and the respective cam ends that biases the load bars toward the secured fulcrum.

2. The cargo rack assembly of claim 1 wherein each of the base bars further comprises a roller at one end for slidable engagement with at least one of the load bars.

3. The cargo rack assembly of claim 1 wherein each of the base bars is configured to attach to a vehicle roof rack.

4. The cargo rack assembly of claim 1, wherein each of the base bars is configured to attached to a support rack comprising a pair of substantially parallel bars affixed to a stationary structure.

5. The cargo rack assembly of claim 1 wherein at least one of the load bars further comprises a latch configured to engage at least one of the base bars at one end and an actuation cable extending from the latch to a release lever at the handle end of the load bar.

6. The cargo rack assembly of claim 1, the load securing means comprising:
   an adjustable strap secured to the load bar at both ends and having a buckle therebetween; and
   a plurality of substantially rigid load arms, each of the load arms being configured to attach to a respective load bar so as to be laterally displaced from each other and being further configured to receive and support the underside of a watercraft.

7. The cargo rack assembly of claim 1, the pivoting levers being coupled together by an extendable crossbar such that the pivoting levers pivot together.

8. The cargo rack assembly of claim 1, further comprising an adjustable crossbar interconnecting said cam ends of said pivoting levers.

9. A cargo rack assembly, comprising:
   a plurality of load bars having a pivot end, a handle end, and means for securing a load;
   a pivoting lever associated with each load bar, the pivoting lever having a cam end pivotally connected to the pivot end and a fulcrum end pivotally connected to the base bar at a secured fulcrum; and
   means for applying a tensile force between each of the handle ends and the respective cam ends that biases the load bars toward the secured fulcrum, the tensile force application means comprising an extension spring having a first end engaging a first locking cord and a second end that engages a second locking cord, the second locking cord being attached to the cam end.

10. The cargo rack assembly of claim 9, the extension spring engaging each of the locking cords via a pulley.

11. The cargo rack assembly of claim 10, the locking cords comprising a portion of the load securing means such that securing a load to the assembly requires that one or both of the locking cords is locked in the high tension position.

12. The cargo rack assembly of claim 10, the locking cords being independently operable to be locked in a high tension position that increases the displacement of the spring.

13. The cargo rack assembly of claim 9, the tensile force application means further comprising a damping piston in parallel with the extension spring, the damping piston being configured to slow the contracting action of the extension spring while having a minimal impact on the extending action of the spring.

14. A cargo rack assembly configured for being affixed to a support rack, said cargo rack assembly comprising:
   at least one load bar having a pivot end and a handle end;
   at least one base bar configured for being affixed to a member of a support rack, the base bar having a first end and a second end;
   a secured fulcrum located between the first and second ends of the base bar;
   a pivoting lever pivotally coupled to said base bar at the secured fulcrum, said pivoting lever further including a head end pivotably coupled to the load bar at the pivot end;
   and
   at least one load arm extending from said load bar and configured for supporting cargo, said load arm comprising means for providing a biasing force that biases the load bar toward the base bar.

15. The cargo rack assembly of claim 14, said biasing force means comprising:
   a cam attached to said load arm;
   a cable attached at a first cable end to a predetermined point on said pivoting lever;
   a spring having a first and second spring end, a second cable end attached to said first spring end, said second spring end connected to said cam; and
   means for actuating said cam so as to tension said cable and spring.

16. The cargo rack assembly of claim 14, further comprising a roller disposed on said base bar configured for engaging said load bar.

17. The cargo rack assembly of claim 14 the load bar further comprising a latch that engages a the base bar at one end, the assembly further including an actuation cable extending from the latch to a release lever at the handle end of the load bar.

18. The cargo rack assembly of claim 14 further including:
   an adjustable strap secured to the load bar at both ends and having a buckle therebetween; and
   at least one substantially rigid load arm configured to attach to the load bar so as to receive and support the underside of a load.

19. The cargo rack assembly of claim 14 further including two load bars each having a secured position and a loading position wherein the transition between the positions is a substantially smooth, one-step motion wherein each of the pivoting levers pivots about the fulcrum as the load bars transition between the secured position and the loading position by sliding relative to the base bars.

20. The cargo rack assembly of claim 19, the pivoting levers being coupled together by an extendable crossbar such that the pivoting levers pivot together.

* * * * *